(12) United States Patent
Kress et al.

(10) Patent No.: US 6,177,113 B1
(45) Date of Patent: Jan. 23, 2001

(54) PROCESS FOR DETECTING PLASTIC OR ELASTOMERIC CONTAMINANTS IN FOOD PROCESSING

(75) Inventors: John E. Kress, Waterloo; Edward W. Birk, Fort Atkinson, both of WI (US)

(73) Assignee: APV Crepaco, Inc., Rosemont, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/495,331

(22) Filed: Jun. 27, 1995

(51) Int. Cl.⁷ ........................................... B65B 57/10
(52) U.S. Cl. ........................... 426/231; 426/232; 53/54
(58) Field of Search ............................ 426/231, 232; 53/54; 324/226

(56) References Cited

U.S. PATENT DOCUMENTS

| | | | |
|---|---|---|---|
| 3,291,377 | * | 12/1966 | Eggen . |
| 4,936,411 | * | 6/1990 | Leonard . |
| 5,051,034 | * | 9/1991 | Goodman . |
| 5,160,885 | * | 11/1992 | Hannam et al. ............ 426/231 |
| 5,165,218 | | 11/1992 | Callahan, Jr. . |
| 5,189,366 | | 2/1993 | Mayo . |
| 5,238,631 | * | 8/1993 | Stolk et al. . |
| 5,291,644 | * | 3/1994 | Musil . |
| 5,304,927 | * | 4/1994 | Thomas et al. . |
| 5,306,466 | | 4/1994 | Goldsmith . |
| 5,346,714 | * | 9/1994 | Peters . |
| 5,429,867 | * | 7/1995 | McCarthy et al. . |
| 5,532,598 | * | 7/1996 | Clark et al. . |

FOREIGN PATENT DOCUMENTS

| | | | | |
|---|---|---|---|---|
| 1276565 | * | 11/1990 | (CA) . | |
| 204317 | * | 11/1983 | (DE) | ............ 426/231 |
| 244979 | * | 11/1987 | (EP) . | |
| 2146128 | * | 4/1985 | (GB) | ............ 426/231 |

OTHER PUBLICATIONS

Modern Plastics Encyclopedia 1984–1985, p. 138 McGraw Hill Publications (vol.61 Ho.10A).*
Packaging Week vol. 4, No. 46 Mar. 29, 1989 pp. 15–16 (Dialog Abstract).*
Frozen & Chilled Foods 48(9) Sep. 1994 p. 38 (Dialog Abstract).*
Prep. Foods 161 (7) 90–92, 1992 (Dialog Abstract).*
Int. FoodHyg 1(5) 15 & 17 1991 (Dialog Abstract).*

* cited by examiner

*Primary Examiner*—Steven Weinstein
(74) *Attorney, Agent, or Firm*—Leydig, Voit & Mayer, Ltd.

(57) ABSTRACT

A method for processing food product includes detecting non-metallic equipment fragments or pieces in the food product during processing by employing processing equipment or components fabricated of a material which comprises a non-metallic primary constituent and a detectable particulate metal constituent interspersed substantially throughout the primary constituent such that no substantial adverse effect on the formability, during manufacture, or structural integrity, during use, of the piece part results, and such that a fragment or piece of the composite material is detectable by use of means for detecting the particulate metal constituent

24 Claims, 2 Drawing Sheets

PROCESS FOR DETECTING PLASTIC OR ELASTOMERIC CONTAMINANTS IN FOOD PROCESSING

FIELD OF THE INVENTION

The present invention relates to the art of and science of detecting plastic or other elastomeric materials which are used in conjunction with food processing, and more particularly, to materials that have metal particulates embedded therein for easy detectability during or subsequent to the food processing.

BACKGROUND OF THE INVENTION

The use of plastic materials in the food processing industry has heretofore posed unavoidable health risks, principally due to the difficulties in detecting the presence of such materials when they are accidently introduced into the food product. Likewise, other elastomeric materials such as rubber materials are frequently utilized as components in the food processing system which processes the food product. When these materials are subjected to temperature change or wear, or even due to mechanical breakdown over the passage of time, their brittleness tends to increase resulting in an easily fracturable material. For this reason, these materials commonly fail through breakage or sloughing off of small pieces, often resulting in piece fragments being introduced into the food product.

Conventional techniques for detecting such materials within the food stuff have included screening or filtering of the food stuff. This solution, however, is viable only when the food stuff being processed is in liquid form and where no particulates are present in the food stuff. Moreover, such screening or filtering can unnecessarily alter the characteristics of the food stuff and requires additional expense in the food processing equipment. Accordingly, there has been no easy or practical method to detect elastomeric materials which are inadvertently lodged within the food product.

SUMMARY OF THE INVENTION

The present invention provides an improvement over the prior art with a material that may be readily used in food processing applications, such as to fabricate plastic or rubber/elastomeric piece parts used as components in a food processing system. The material according to the present invention includes a first plastic or elastomeric material constituent and a second metal constituent. The metal constituent is preferably mixed with the plastic material constituent at a relatively small percentage by weight so that it does not effect the properties of the plastic material. The metal constituent, however, is detectable with a conventional metal detecting device so that the presence of the material within a food product can be determined.

In another aspect of the invention, a method of detecting the presence of a material in a food processing application is provided. The method includes the steps of providing a material to be used in conjunction with the food processing application where the material comprises a first plastic or elastomeric constituent and a second metal constituent. The food product is processed in a next step. Thereafter, the food product is scanned by a metal detecting device in order to determine whether the material is present in the food product. Finally, the metal detecting device provides an appropriate alarm or other signal when the presence of the material is detected.

DETAILED DESCRIPTION OF THE PREFERRED EMBODIMENTS

Generally, the present invention relates to materials and components formed using a polymeric material, such as a plastic or rubber/elastomeric material that is utilized in a food processing application. The material of the present invention comprises a first polymeric material constituent and a second metal constituent that is detectable with a conventional metal detecting device.

One intended use for the material made according to the present invention is for fabricating piece parts such as plastic diaphragms used in pumps, blades or impellers in mixers or for smaller parts such as washers or O-rings in fitted connections and the like, in food processing applications, particularly those where metal detecting equipment is already in place. Inasmuch as the material is detectable by such metal detecting equipment, the invention directly addresses safety concerns caused by the introduction of these types of materials into a food product during processing.

Figure 1:
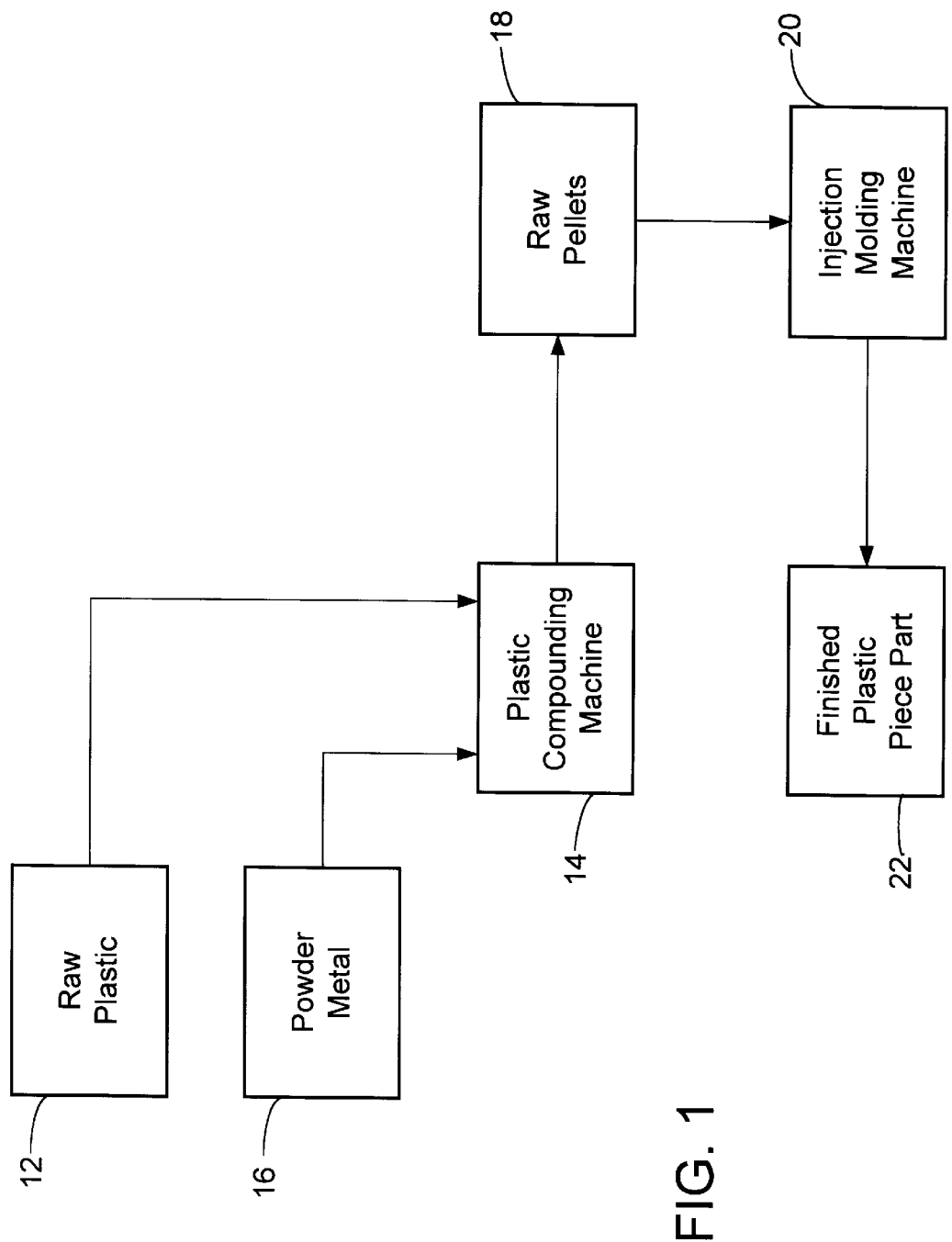
FIG. 1 is a simplified block diagram representation of a fabrication process for forming a piece part from a plastic material according to one embodiment of the present invention.

FIG. 1 illustrates a simplified block diagram representation of a process 10 utilized to fabricate a piece part made of a plastic material according to the present invention. As shown therein, a raw polymeric material denoted by a block 12 is supplied to a plastic compounding machine 14 as will be readily understood by one skilled in the art. In addition, a powdered metal denoted by a block 16 is added to the machine 14 during a melt process of the polymeric material. The powdered metal is preferably added to the compounding machine 14 at a rate of approximately one (1) per cent to five (5) per cent by weight of the polymeric material.

The plastic compounding machine 14 mixes the raw plastic and powdered metal to provide a homogeneous mixture of plastic and powdered metal in which the powdered metal becomes embedded within the interstices of the plastic material. Additional material components, such as fiberglass, may also be added to achieve such desired properties as increased strength. This blend is then pelletized to make raw feed pellets denoted by a block 18. One method for pelletizing the blend is by extrusion of the blend under pressure, followed by chilling and cutting as will be understood by those skilled in the art.

One preferred polymer that may be utilized in the formation of the plastic material is a polyoxymethylene copolymer (also known as acetal copolymer) such as the one sold under the tradename Celcon M90 CD3068, and manufactured by Hoechst Celanese Corporation. This particular copolymer has a melting point of 165 deg C. and a specific gravity of 1.4 to 1.8. Other suitable polymers may likewise be utilized. For example, the polymer may alternatively comprise a polyphenylene sulfide (also known as PPS or polyphenylene sulfide) such as the one sold under the tradename RTP 1303 TFE 15 LE Natural, manufactured by RTP Company, Winona Minn.

RTP 1303 TFE 15 LE Natural has a specific gravity of 1.44.

Similarly, while many metal materials which are detectable by conventional metal detection equipment may be used, one preferred material is a metal powder such as a stainless steel powder. For example, austenitic steel, such as 410SST or 17-4 type steel may be utilized. One specific suitable metal powder is the stainless steel powder marketed by Ametek Specialty Metals Division of Eighty-Four, Pennsylvania. This metal powder is also known as Tool Steel powder or Pre-alloyed stainless steel powder. The powder has a specific gravity in the range of 7.5 to 9.3 and is a fine gray powder. Other powders may be used which are detectable by known detection means while being of sufficiently small particle size to permit molding of the polymer.

The pellets 18 are thereafter supplied to an injection molding machine 18, which operates in a known fashion, to mold finished plastic piece parts denoted by a block 20. In this way, various plastic component pieces that are used in a food processing system may be fabricated according to the present invention. For example, the pieces fabricated in this manner may include plastic sleeve bearings, blades or the like.

One advantage of using a blend of powdered metal mixed with the raw plastic is that there is no perceptible effect on the injection molding process or on the structural integrity of the resulting plastic piece part. One reason for this is the relatively small particulate size of the powdered metal, for example, on the order of 45 micromm (corresponding to 325 mesh). In addition, the percentage by weight of metal added is relatively small.

Another reason that there is no perceptable effect on the resultant material is the relative densities of the materials. For example, when the powdered metal material, such as an austenitic steel having a density on the order of 0.3 lbs/cu in., is mixed with a plastic having a density of 0.05 lbs/cu in. in a ratio of 5 percent steel by weight and 95 percent plastic by weight, the metal material comprises only approximately 0.8 percent by volume of the resulting mixture.

It has been found that powdered metal that is mixed with the plastic material at a rate of about one (1) percent (by weight) may be readily detected with the use of a conventional metal detector, such as a type Metalcheck, manufactured by Yamamoto Lock. In the case of smaller piece components or for improved detectability, the percentage of metal (by weight) may be increased. For example, a mixture of powdered metal with a plastic material in the range of 2.5 percent to 5 percent (by weight) may also be used without altering the properties of the plastic material. Other ratios of metal with plastic are contemplated by the present invention although it is preferred that the metal powder component be in the range of about 1 percent by weight to about 5 percent by weight of the total composition.

While the presently contemplated best mode for practicing the invention includes the use of a powdered metal, other forms may be used as well. For example, metal shavings or other particulates detectable by metal detection or X-ray equipment may be deposited into the plastic material so long as the metal pieces do not substantially interfere with the formation of the final end product.

The present invention may also be used to fabricate other polymeric components such as rubber/elastomer components. These components may likewise be made by mixing metal powder in the above-noted concentration by weight during the processing of the rubber/elastomer. In this way, piece parts such as O-ring gaskets, diaphragms in pumps and like may also include metallic particles embedded therein that are detectable by conventional metal detection equipment. Thus, for example, an elastomeric material such as butadiene-acrylonitride rubber (also known as nitride rubber, BUNA N or NBR). One such rubber is marketed under the tradename T538 Albert Trostel Packings, Ltd. of Lake Geneva, Wis. T538 has a specific gravity of 1.28. Materials such as natural rubber, viatran, nitran and neoprene may likewise be utilized.

Figure 2:
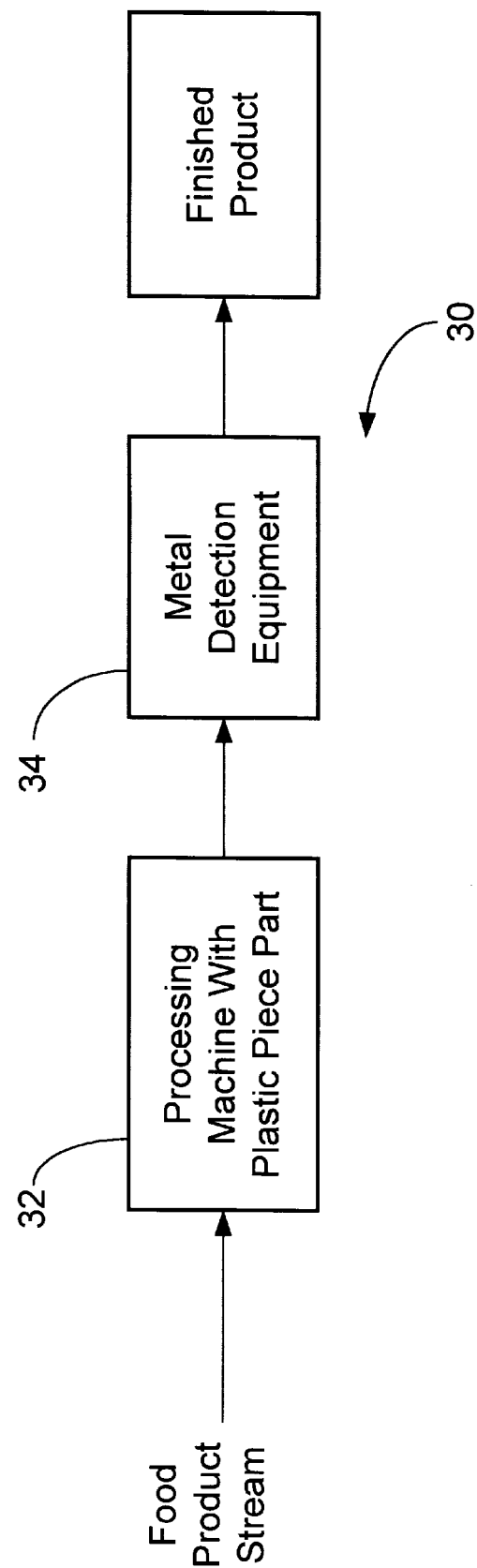
FIG. 2 is a simplified block diagram representation of a food processing line that may utilize one or more plastic piece parts fabricated as is shown in FIG. 1.

FIG. 2 is a generic block diagram representation of a food processing line 30, including a processing machine 32 having one or more components fabricated from a polymer in the manner described above in conjunction with FIG. 1. As shown therein, a food stuff is supplied to the machine 32 for processing. During this step, one or more of plastic and/or rubber/elastomer components contact the food stuff, and in some instances, the components or fragments thereof break off and are lodged within the food stuff. The food stuff is thereafter passed through metal detection equipment 34. The metal detection equipment provides an appropriate signal such as an alarm signal upon the detection of the metal constituent within the component fragment. In this way, any plastic and or rubber/elastomer material embedded within the food stuff is detected so that corrective action may be taken.

One example in which corrective action may be taken is where the detection equipment is coupled with a divert valve (not shown) and accompanying divert stream. In this instance, the metal detection equipment provides an appropriate command signal to actuate the divert valve in order to divert the food product for a selected time interval to remove the plastic component or fragment thereof. Alternatively, the food product may pass the metal detection equipment after final packaging of the product. Typically, any container from which metal is detected is discarded.

Although metal detection equipment may be utilized to detect when the metallized material is present, other detection equipment such as X-ray equipment may be utilized to detect the metallized material, particularly due to the density difference between the metallized material and a food product such as ice cream or citrus juice.

In another preferred embodiment of the present invention, a powdered metal is mixed with a polymer material to provide a resulting thin film material that may be used as a plastic wrap in a food processing application. The resulting thin film material includes a plastic constituent, such as polyethylene, and a metal constituent preferably in the form of powdered metal. While other metal forms may be utilized in the context of this invention, one advantage of using a powdered metal is that there is no perceptible effect on the extruding process of the thin film. Likewise, powdered austenitic steel, such as 410SST or 17-4 type steel, or other suitable powdered metals may be utilized.

EXAMPLE 1

One example of a food processing system piece part made according to the present invention is a plastic scraper blade. To form the plastic pellets for this component, the following were mixed in a plastic compounding machine:

| Component | Weight % |
|---|---|
| Stainless Steel Powder | 5 |
| PPS (plastic) | 73.2 |
| Fiberglass | 19 |
| Teflon | 2.8 |

Following the blending of the above plastic composition, the composition was pellitized. The pellets were then fed to a screw-type HPM injection molding machine to form the piece part component. The piece part component was then subjected to an abrading force to introduce a few small pieces into a liquid to simulate use in a liquid stream food processing installation. The liquid was then scanned using the Metalchek metal detector and the abraded plastic pieces were detected by the metal detector.

Accordingly, a plastic material with a metallic substance embedded therein for ready detectability in a food processing system that meets the aforestated objectives has been described. It will be apparent to those skilled in the art that a number of modifications can be made to the invention disclosed, particularly by those having the benefit of the foregoing teachings, without departing from the spirit of these principles. Accordingly, it is intended that the invention be limited only by the scope of the appended claims.

What is claimed is:

1. A method for processing food product having a plastic or elastomeric covering material including a first plastic or elastomeric material component and a particulate metal second material component which is detectable with metal-detecting equipment, said second material component being embedded in and interspersed in the first material component, said particulate metal being of a size and amount such that no perceptible effect on the structural integrity of the covering material results, the method including the steps of:

removing the covering material from the food product;

processing the food product with the covering material removed;

detecting for the second material component in the food product to determine when the covering material is present in the food product; and supplying a detection signal when the presence of the the covering material is detected.

2. The method as in claim 1 wherein the particulate metal second material component is a powdered metal.

3. The method as in claim 2 wherein the particulate metal second material component is present in an amount of from between about one percent to about five percent by weight of the covering material.

4. The method as in claim 1, wherein the first plastic or elastomeric material component is a plastic.

5. The method as in claim 1 wherein the particulate metal second material component comprises metal shavings or filings.

6. The method as in claim 1 wherein the covering material is a film material.

7. A method for automatically detecting piece part fragments during the processing of food product with the use of food processing equipment including at least one plastic or elastomeric piece part having been fabricated of a material including a first plastic or elastomeric constituent and a particulate metal second constituent which is detectable with metal detecting equipment, said second constituent being embedded in and interspersed substantially throughout the first constituent, said particulate metal being of a size and amount such that no perceptible effect on the structural integrity of the piece part results, the method comprising the steps of:

processing the food product with the processing equipment;

detecting for the second constituent in the food product downstream from the processing equipment to determine when fragments of the piece part are present in the food product; and supplying a detection signal when fragments of the piece part are detected in the food product.

8. The method as in claim 7 wherein the particulate metal second constituent is a powdered metal.

9. The method as in claim 8 wherein the particulate metal second constituent comprises from between about one percent to five percent by weight of the piece part.

10. The method as in claim 8 wherein the particulate metal second constituent comprises about one percent by weight of the piece part.

11. The method of claim 7 wherein the particulate metal second constituent is detected with metal detecting equipment.

12. The method as in claim 11 wherein the first non-metallic constituent is plastic.

13. The method as in claim 11 wherein the firs non-metallic constituent is a rubber/elastomer.

14. The method as in claim 11 wherein the particulate metal second constituent comprises metal shavings or filings.

15. A method for detecting the presence of plastic or elastomeric food covering material while processing food product including the steps of:

removing a plastic or elastomeric covering material from the food product, the plastic elastomeric covering material including a first plastic or elastomeric material constituent with a particulate metal second constituent, said second constituent being embedded in and interspersed substantially throughout the first plastic or elastomeric material constituent, said particulate metal being of size and amount such that no perceptible effect on the structural integrity of the covering material results;

processing the food product after the covering material is removed;

detecting for the particulate metal second constituent in the food product to determine when pieces of the covering material are present in the food product; and signaling when the presence of the covering material is detected in the food product.

16. The method of claim 15 wherein the plastic or elastomeric covering material is a film material.

17. The method of claim 15 wherein the particulate metal second constituent is powdered.

18. The method as in claim 17 wherein the particulate metal second constituent is present in an amount of from between about one percent to about five percent by weight of the covering material.

19. A method for detecting piece part fragments while processing food product with the use of food processing equipment having at least one plastic or elastomeric piece part having been fabricated of a material including a first plastic or elastomeric constituent with a particulate metal second constituent, said second constituent being embedded in and interspersed throughout the first plastic or elastomeric constituent, said particulate metal being of a size and amount such that no perceptbile effect on the structural integrity of the piece part results, the method comprising:

processing the food product with processing equipment;

detecting for the particulate metal second constituent in the food product downstream from the processing equipment to determine when fragments of the plastic or elastomeric piece part are present in the food product, and generating sensing signal when fragments of the plastic or elastomeric piece part are detected in the food product.

20. The method of claim 19 wherein the particulate metal second constituent is powdered.

21. The method as in claim 20 wherein the particulate metal second constituent is present in an amount of from between about one percent to about five percent by weight of the piece part.

22. The method as in claim 19 further comprising the step of diverting the food product for a selected interval upon receipt of the sensing signal so that the fragments may be removed.

23. A method for detecting plastic piece part fragments while processing food product with the used of food processing equipment having at least one piece part having been fabricated of a material including a first polymeric constituent with a particulate metal second constituent which is detectable with conventional detection equipment, said second constituent being embedded in and interspersed substantially throughout the material, said particulate metal being of a size and amount such that no perceptible effect on the structural integrity of the piece part results, the method including the steps of:

processing the food product with the processing equipment;

detecting for the particulate metal second constituent in the food product downstream from the processing equipment to determine when fragments of the piece part are present in the food product;

passing the food product downstream when the presence of fragments of the piece part are not detected;

generating a sensing signal when the presence of fragments of the piece part are detected; and diverting the food product for a selected interval upon receipt of the sensing signal.

24. A method for detecting the presence of plastic covering material while processing food product including the steps of:

removing a covering material from the food product, the covering material including a first polymeric material constituent with a particulate metal second material constituent which is detectable with a conventional detecting device, said second constituent being embedded in an interspersed throughout the first polymeric material constituent, said particulate metal being of a size and amount such that no perceptible effect on the structural integrity of the piece part results;

processing the food product with the covering material removed;

detecting for the particulate metal second material constituent in the food product to determine when pieces of the covering material are present in the food product; and passing the food product downstream when the covering material is absent from the food product; and signally when the presence of the covering material is detected.

* * * * *